(12) United States Patent
Manjure et al.

(10) Patent No.: US 11,987,696 B2
(45) Date of Patent: May 21, 2024

(54) BIOBASED POLYESTER BLENDS WITH ENHANCED PERFORMANCE PROPERTIES

(71) Applicant: NORTHERN TECHNOLOGIES INTERNATIONAL CORPORATION, Circle Pines, MN (US)

(72) Inventors: Shilpa Manjure, Woodbury, MN (US); Matthew Lundblad, Woodbury, MN (US)

(73) Assignee: Northern Technologies International Corporation, Circle Pines, MN (US)

(*) Notice: Subject to any disclaimer, the term of this patent is extended or adjusted under 35 U.S.C. 154(b) by 446 days.

(21) Appl. No.: 17/261,367

(22) PCT Filed: Aug. 7, 2018

(86) PCT No.: PCT/US2018/045586
§ 371 (c)(1),
(2) Date: Jan. 19, 2021

(87) PCT Pub. No.: WO2020/032931
PCT Pub. Date: Feb. 13, 2020

(65) Prior Publication Data
US 2021/0277228 A1    Sep. 9, 2021

(51) Int. Cl.
*C08L 67/04* (2006.01)
(52) U.S. Cl.
CPC ........... *C08L 67/04* (2013.01); *C08L 2201/06* (2013.01); *C08L 2205/025* (2013.01); *C08L 2205/03* (2013.01); *C08L 2207/04* (2013.01)

(58) Field of Classification Search
CPC ........... C08L 2205/02; C08L 2205/025; C08L 2205/03; C08L 67/00–08; C08L 67/04
See application file for complete search history.

(56) References Cited

U.S. PATENT DOCUMENTS

| 5,883,199 A | 3/1999 | McCarthy et al. |
| 9,388,581 B2 | 7/2016 | Lee et al. |

(Continued)

FOREIGN PATENT DOCUMENTS

| CN | 101735583 A | * | 6/2010 |
| CN | 102504506 A | | 6/2012 |

(Continued)

OTHER PUBLICATIONS

CN 101735583 A machine translation (Jun. 2010).*

(Continued)

*Primary Examiner* — Ana L. Woodward
(74) *Attorney, Agent, or Firm* — Hudak, Shunk & Farine Co. LPA

(57) ABSTRACT

The invention relates to a biodegradable and compostable blend of polylactic acid, a compostable polyester with or without carbon based biocontent, polyethylene glycol, and optionally an inorganic talc filler that have greatly increased elongation, flexibility, and tensile toughness as measured by tensile test ASTM D638-10. These blends of PLA with 5-30% of said polyester, about 10% PEG, and about 5% of an inorganic talc filler unexpectedly increased the elongation to 750+ % for molded test bars. Additionally, 4 mil films showed a max tear strength of about 1200 gms (in MD) and 900 gms (in TD) measured by ASTM D1922-09 while maintaining other preferable properties.

20 Claims, 7 Drawing Sheets

(56) References Cited

U.S. PATENT DOCUMENTS

| | | |
|---|---|---|
| 9,884,471 B2 | 2/2018 | Neuman et al. |
| 2004/0241359 A1 | 12/2004 | Miksic et al. |
| 2009/0111787 A1 | 4/2009 | Lim et al. |
| 2012/0232504 A1 | 9/2012 | Chang et al. |
| 2014/0235740 A1 | 8/2014 | Liu |
| 2016/0017134 A1 | 1/2016 | Desille |
| 2016/0177086 A1* | 6/2016 | Marini .................. C08L 1/02 524/451 |
| 2016/0257098 A1 | 9/2016 | Nissenbaum et al. |

FOREIGN PATENT DOCUMENTS

| | | |
|---|---|---|
| CN | 106398138 A | 2/2017 |
| CN | 106750253 A | 5/2017 |
| CN | 106883569 | 6/2017 |
| EP | 2727962 A1 | 5/2014 |

OTHER PUBLICATIONS

Bijarimi et al., Poly(lactic acid) / Poly(ethylene glycol) Blends: Mechanical, Thermal and Morphological Properties, International Advances in Applied Physics and Materials Science Congress & Exhibition, 2015, pp. 020002-1-020002-9.

Chavalitpanya et al., Poly(lactic acid)/Polycaprolactone Blends Compatibilized with Block Copolymer, Energy Procedia, 2013, vol. 34, pp. 542-548.

Dewolfe, A., How to Perform an ASTM D638 Plastic Tensile Strength Test, Jul. 6, 2010, pp. 1-3 (retrieved on Oct. 5, 2018 from http://info.admet.com/videos/bid/42915/How-to-Perform-An-ASTM-D638-Plastic-Tensile-Strength-Test.

Hongdilokkul, P. et al., A Study on Properties of PLA/PBAT From Blown Film Process, IOP Conf. Series: Materials Science and Engineering, 2015, vol. 87, pp. 1-8.

Liu, H. et al., Research Progress in Toughening Modification of Poly(lactic acid), Journal of Polymer Science Part B: Polymer Physics, 2011, vol. 49, pp. 1051-1083.

Muthuraj, R. et al., Biodegradable Compatibilized Polymer Blends for Packaging Applications: A Literature Review, Journal of Applied Polymer Science, 2017, pp. 45726 (1-35).

Pivsa-Art, W. et al., The Effect of Poly(ethylene glycol) as Plasticizer in Blends of Poly(lactic acid) and Poly(butylene succinate), Journal of Applied Polymer Science, 2016, pp. 43044 (1-10).

Saravana, S. et al., Effect of Polyethylene Glycol on Mechanical, Thermal and Morphological Properties of Talc Reinforced Polylactic Acid Composites, Materials Today: Proceedings, 2018, vol. 5, pp. 1591-1598.

Sungsanit, K. et al., Properties of Linear Poly(Lactic Acid)/Polyethylene Glycol Blends, Polymer Engineering and Science, 2012, pp. 108-116.

Pivsa-Art, W. et al., Preparation of Polymer Blends Between Poly (L-lactic acid), Poly(butylene succinate-co-adipate) and Poly(butylene adipate-co-terephthalate) for Blow Film Industrial Application, Energy Procedia, Nov. 7, 2011, vol. 9, pp. 581-588.

* cited by examiner

Compostable polyester

Compostable random copolyester x = 2 through 10
y = 2 through 8, 34 (dimer fatty acids)

Adipic, Sebacic, Azealic, Succinic

BIOBASED POLYESTER BLENDS WITH ENHANCED PERFORMANCE PROPERTIES

FIELD OF THE INVENTION

The present invention relates to a biodegradable and compostable blend of polylactic acid (PLA) and compostable polyesters with or without biobased carbon content having the general structure shown in FIG. 8, such as preferable, polybutylene adipate co-terephthalate (PBAT) and polyethylene glycol (PEG) with the mentioned blend having greatly unexpected increases in elongation, flexibility, and tensile toughness as measured by ASTM D638-10 compared to pure PLA or binary blends of PLA with PBAT, or with PEG. For example, elongation increases in excess of 750+ % were achieved without break.

BACKGROUND OF THE INVENTION

Poly(lactic) acid (PLA) is becoming a widely used material due to its biobased content and compostability. However, it has high rigidity and brittleness making it unusable in flexible applications for packaging films, thermoformed sheets and molding requiring higher toughness and reduced brittleness.

Several researchers have published work related to blending of plasticizers (such as Polyethylene Glycol (PEG) and citrate esters) with PLA for improved flexibility. These blends do show an increase in % elongation compared to pure PLA or to a blend of PLA with a plasticizer of up to 10%. For example, Jacobsen and Fritz showed an increase in % elongation up to 40% for 10 wt. % addition of PEG (with a molecular weight of 1500) compared to a % elongation of PLA of <5% [1].

Plasticizers, however, tend to bleed out overtime and can be of concern for several products. PEG has been referenced many times in literature as being susceptible for migration to the surface of products producing unsatisfactory results. Peng Cheng and Yan Pengfei state that using PEG with Polybutylene adipate co-terephthalate (PBAT) and PLA alloys results in poor material stability and unsatisfactory results [2]. Several patents from Peng Cheng and Yan Pengfei use PLA/PBAT films. In one patent, they claim a method of modifying PEG using a phthalic anhydride and multiple steps in a reaction vessel [2]. In a second patent, they claim a PBAT/PLA composite film made with PBAT, PLA, Calcium carbonate, and an antibacterial titanate [3].

PLA is high in strength and modulus (60+MPa and 3.4 GPa, respectively) but brittle (strain at break<5%) while PBAT is flexible and tough. As a result, of these complementary properties, it is common to blend PLA with PBAT and other compostable polyesters with or without biobased carbon content such as polybutylene succinate (PBS), polybutylene succinate adipate (PBSA) and polycaprolactone (PCL). This improves the performance of PLA without compromising its biodegradability. P. Hongdilokkul el al showed that addition of 20% PBAT with and without reactive additive resulted in an increase in elongation up to 288% and 200% respectively [4].

SUMMARY OF THE INVENTION

This invention relates to biodegradable and compostable blends of PLA, compostable polyesters with or without biobased carbon content such as PBAT, and PEG polymers. Unexpectedly, blends of PLA with from about 5 wt. % to about 30 wt. % PBAT and about 7 wt. % to about 15 wt. % of PEG increased the elongation to 750+ % for molded test bars as seen in FIGS. 1d, 2, and 3. Additionally, 4 mil films showed a maximum tear strength of about 1200 gms (in MD) and about 900 gms (in TD) while maintaining other preferable properties.

This exceptional improvement in performance is unexpected and not predictable by blend theory—blending immiscible polymers would induce phase separation and cause reduction in properties. These immiscible polymer blends are often overlooked and insufficient for many applications.

A biodegradable and compostable blend of thermoplastic polymers comprises from about 50 wt. % to about 80 wt. % of one or more poly(lactic) acid (PLA) polymers wherein said PLA polymer has a weight average molecular weight of from about 125,000 to about 200,000; from about 5 wt. % to about 30 wt. % of one or more compostable polyesters with or without biobased carbon content wherein said polyester has a weight average molecular weight of from about 80,000 to about 175,000; from about 7 wt. % to about 15 wt. % of one or more PEGs with or without biobased carbon content wherein said PEGs have a weight average molecular weight from about 2,000 to about 10,000; wherein said weight percent is based upon the total weight of said one or more PLAs, said one or more compostable polyesters, and said one or more PEG polymers; and wherein said blend has an elongation of at least 500% at according to ASTM Test D638-10 for injection molded specimens.

DETAILED DESCRIPTION OF THE INVENTION

The poly(lactic) acid polymers of the present invention that are utilized in a biodegradable and compostable polyester blend with PEG have a weight average molecular weight of from about 125,000 to about 200,000, and desirably from about 125,000 to about 160,000. The molecular weight of the PLA polymers as well as the other polymers set forth herein is determined by Gel Permeation Chromatography (GPC) using polystyrene standards, a refractive index detector, and chloroform as the solvent. The amount of the PLA can generally range from about 50 wt. % to about 80 wt. %, desirably from about 60 wt. % to about 80 wt. %, and preferably form about 70 wt. % to about 80 wt. % based upon the total weight composition of the ternary blend of polymers of the present invention. That is, one or more PLA polymers, one or more polyester polymers such as PBAT polymers, and the one or more PEG polymers.

Figure 8:
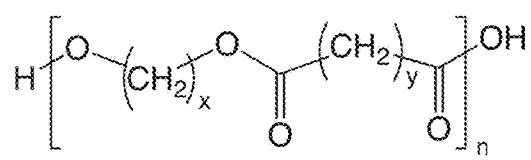
FIG. 8. relates to compostable polyester formulas with or without biobased carbon content.
Figure 8:
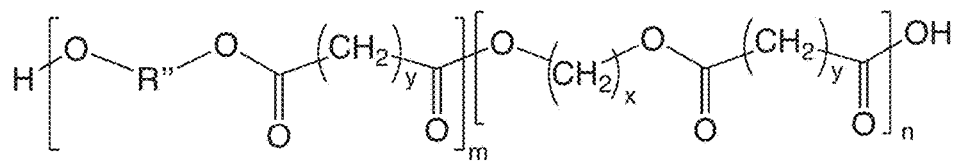
Figure 8:
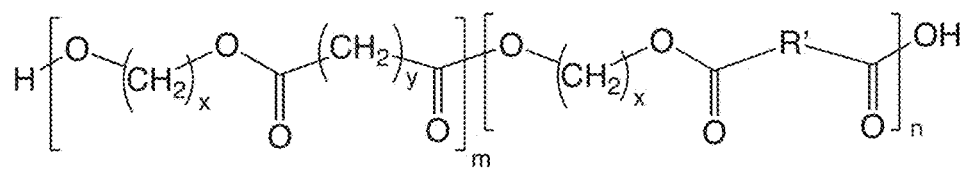
Figure 8:
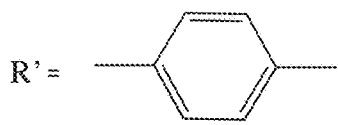
Figure 8:
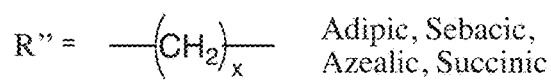

The one or more different polyester polymers include polymers having the formulation as set forth in FIG. 8. That is, the polyester polymer can be a compostable polyester, or one or more different types of compostable random copolyesters. The molecular weight, i.e. "n" and "m" can vary provided that the total weight average molecular weight of the polymer or copolymer polyester is within the ranges set forth hereinbelow. Examples of desired polyester polymers include, but are not limited to, polybutylene succinate, PBS, polybutylene succinate adipate, PBSA, polycaprolactone, PCL, and preferably polybutylene adipate co-terephthalate, PBAT, and the like, or any combination thereof. Such polymers generally have a weight average of molecular weight of from about 80,000 to about 175,000, and desirably from about 130,000 to about 160,000. The amounts of one or more different polyester polymers is generally from about 5 wt. % to about 30 wt. %, desirably from about 5 wt. % to about 20 wt. %, and preferably from about 5 wt. % to about 15 wt. % based upon the total weight of the ternary blend of polymers of the present invention.

The weight average molecular weight of the one or more PEG plasticizers, with or without biobased carbon content, utilized in the present invention is generally about 2,000 to about 10,000, desirably from about 3,000 to about 7,500, and preferably from about 5,000 to about 7,000. The total amount of PEG is generally from about 7 wt. % to 15 wt. %, desirably from about 8 wt. % to 12 wt. %, and preferably from about 9 wt. % to about 11 wt. % based upon the total weight of the ternary blend of polymers of the present invention.

Various additives can be utilized with a preferred additive being talc which can be obtained from any source. Talc is utilized in the present invention as an inorganic filler and processing aid. The mean size of the talc particles is generally from 1 μm to about 5 μm. The amount of talc is generally from about 2 to about 10 wt. %, desirably from about 3 to about 7 wt. %, and preferably about 4 to about 6 wt. % based upon the total weight of the ternary blend of polymers of the present invention The above ternary blend of PLA, PBAT, and PEG can contain various other additives therein such as UV light inhibitors, generally about 0.25 wt. % and slip compounds, generally about 0.25 wt. % based upon the total weight of the one or more PLA compound, the one or more polyester, and the one or more PEG compounds, i.e., the above noted thermoplastic ternary blend of polymers of the present invention.

EXPERIMENTAL

Compounding was carried out in a LabTech Scientific LTE-26 co-rotating 26 mm twin screw extruder with an L/D ratio of 44:1. Samples were taken from the beginning, middle, and end of each extrusion run and tested for ash and formulation consistency using a muffle furnace and thermogravimetric analyzer (TGA) respectively. Compounded blends were then converted into injection molded bars measuring 0.5 inches in width by 2.25 inches in length and extruded films for performance analysis.

1) Injection Molded Bars—Injection molding was carried out using a Toshiba EC85SX with an ASTM Test bar mold. Tensile test bars having a size of about 0.5 inches by 2.25 inches were tested in accordance to ASTM D638-10 on a QTest dual column universal testing machine. Stress-strain curves were generated using load and extension data. Properties reported include Tensile Modulus, Tensile Strength, and Elongation to break or test failure. Notched Izod Impact data was gathered in accordance to ASTM D256-10e1 using a Tinius Olsen Model IT504 pendulum impact tester. Specimens were notched using a Tinius Olsen Model 899 Specimen Notcher.

2) Extruded Films: Films were extruded at approximately 4 mil thickness on a LabTech Scientific 20 mm compact blown film line type LE20/C. Two loading of 5 and 10% PEG were chosen at two different molecular weights of 6000 MN and 1500 MW. Tensile strength and % elongation to break were measured one week after film production in accordance to ASTM D882-10 using an Instron Model 5544 universal testing machine with a 200 N load cell. Tear strength of the film was measured in accordance to ASTM D1922-09 using an Elmendorf Thwing-Albert Protear testing machine.

Results and Discussion:

1) Injection Molding

Ternary blends of Polylactic Acid (PLA), Polybutylene adipate co-terephthalate (PBAT), and Polyethylene Glycol (PEG) were compounded in different ratios as summarized in Table 1 for injection molding. Talc was added at 5 wt. % for ease of processing on the compounding line. The objective was to improve mechanical performance of PLA and study effect of addition of both PBAT and PEG in comparison to binary blends of these modifiers with PLA. % PBAT in formulation was varied from 0-30 wt. % while maintaining PEG at 10 wt. %, based on typical PEG use in previous studies by other researchers [5] (blends noted as IM1 through IM5). Additional blends were run in the design of experiment with no PEG and only PBAT (IM6) as a second control. Note IM1 and IM6 are binary blends of PLA with PEG and PBAT respectively.

TABLE 1

| Injection Molding Formulation breakdown | | | | |
|---|---|---|---|---|
| Sample | % PLA | % PBAT | % PEG | % Talc |
| IM1 | 85 | 0 | 10 | 5 |
| IM2 | 80 | 5 | 10 | 5 |
| IM3 | 75 | 10 | 10 | 5 |
| IM4 | 70 | 15 | 10 | 5 |
| IM5 | 65 | 30 | 10 | 5 |
| IM6 | 60 | 30 | 0 | 10 |

Mechanical properties obtained by various ASTM tests are summarized in Table 2 below and plotted in FIG. 1 (a)-(d).

Figure 1A:
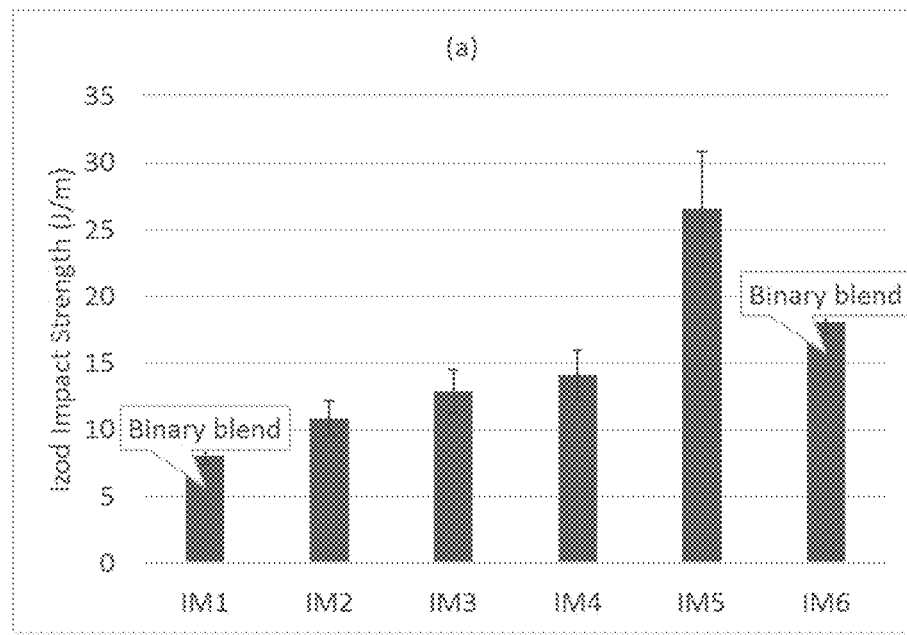
FIGS. 1a through 1d show mechanical properties of PLA/PBAT/PEG blends with the formulations of Table 1.
Figure 1B:
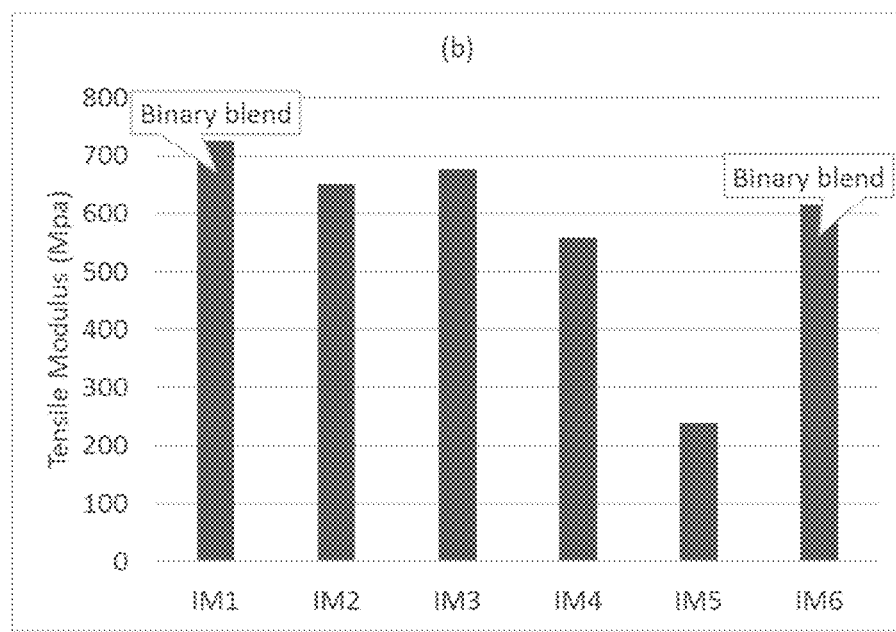
Figure 1C:
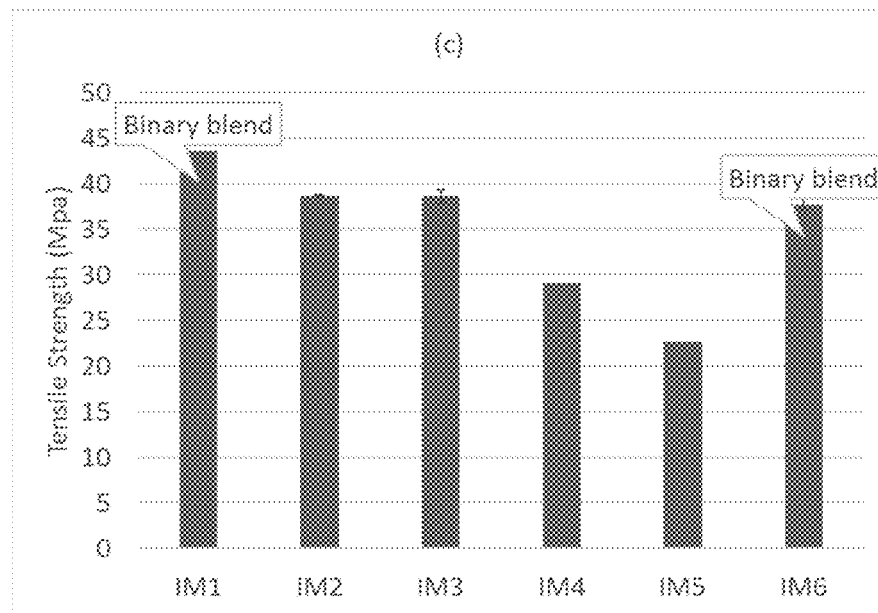

FIG. 1a shows that impact strength increased from 8 J/gm to 26 J/gm with increased PBAT content of 0% to 30 wt. %, at 10 wt. % PEG for blends IM1 to IM5. Once the PEG was removed in IM6 the impact strength decreased back down to 18 J/gm due to total reduction in modifier wt. % as expected. PLA typically has an izod impact strength of ~16 J/m [6]. One reason for the impact strength to not increase significantly could be the immiscibility of the PEG and PBAT in PLA resulting in distinct phases which were not able to transfer the impact energy across the phases. FIGS. 1b and 1c show effect of increasing PBAT on the tensile modulus and tensile strength of these blends. The modulus (stiffness) was highest at 725 MPa with 10 wt. % PEG and no PBAT in the blend. As the amount of PBAT increased the stiffness or modulus decreased. The lowest stiffness was obtained for highest PBAT loading in this study of 30 wt. % with 10 wt,% PEG. Addition of PBAT, which is a very flexible polyester with a lower strength compared to PLA, reduced the modulus and tensile strength of the blend, as expected, compared to the binary blends of PLA and PEG.

Figure 1D:
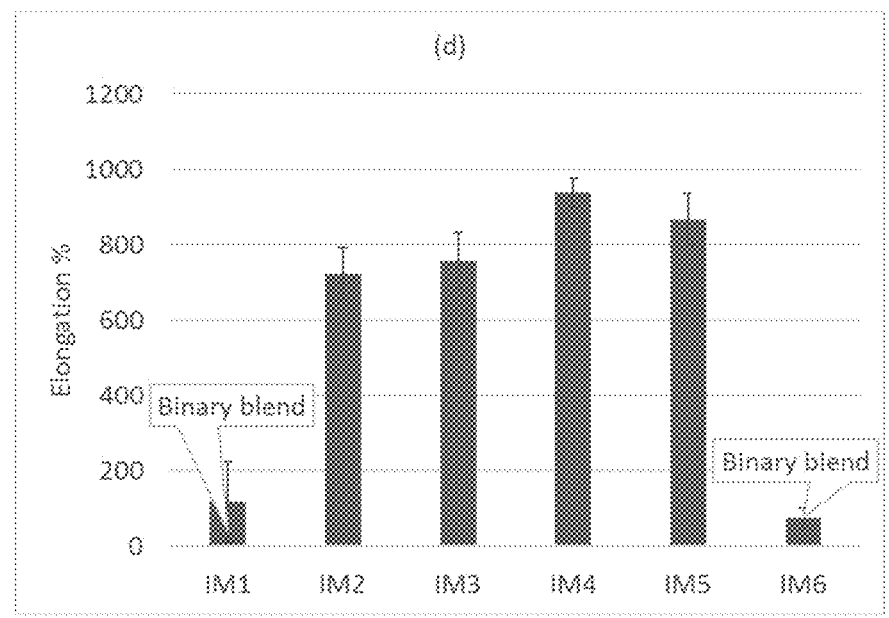

Unexpected results were observed for the tensile elongation of the blends in FIG. 1d. Binary blends IM1 (PLA/PEG) and IM6 (PLA/PBAT) showed higher elongation compared to that of PLA closer to 100 wt. %. However, any ternary blend of these three ingredients increased the wt. % elongation beyond that predicted by blend theory. Even addition of PBAT at 5 wt. % (IM2) was enough to increase the elongation by 626% compared to the binary blend in IM1.

Generally, elongation values of at least 500%, desirably at least 550% or at least 600%, or even at least 650% and at least 700%, and at least 750% were obtained at 23° C. Also, unexpected tear strengths in the machine direction of 4 mil film of at least 800 grams, desirably at least 900 or 1,000 grams, and preferably at least 1,100 or at least 1,200 grams were obtained in accordance with ASTM Test D1922-09. In addition, tear strengths in the transverse direction of 4 mil film of at least 500 grams, desirably at least 600 or 700 grams, and preferably at least 800 were obtained in accordance with ASTM Test D1922-09

Note that when the elongation to break exceeded 800% the samples had a high risk of slipping out of the grips resulting in an inaccurate elongation data. These have been starred below in Table 2.

TABLE 2

Mechanical properties of Injection Molded Test Bars

| Sample | Impact Strength (J/m) Value | St. dev | Tensile Modulus (MPa) Value | St. dev | Ultimate Tensile Strength (MPa) Value | St. dev | Elongation to Break (%) Value | St. dev |
|---|---|---|---|---|---|---|---|---|
| IM1 | 8.01 | 0.6 | 725.7 | N/A | 43.3 | 0.47 | 117.2 | 106.9 |
| IM2 | 10.9 | 1.3 | 651.8 | N/A | 38.7 | 0.1 | 733.3 | 57.7 |
| IM3 | 12.9 | 1.6 | 676.2 | N/A | 38.6 | 0.72 | 756.3 | 75.6 |
| IM4 | 14.1 | 1.9 | 558.0 | N/A | 29.2 | 2.39 | 938.5* | 38.2 |
| IM5 | 26.5 | 4.3 | 238.0 | N/A | 22.7 | 2.67 | 868.2* | 68.2 |
| IM6 | 18.1 | 0.9 | 616.3 | N/A | 37.7 | 0.94 | 75.2 | 26.7 |

Figure 2:
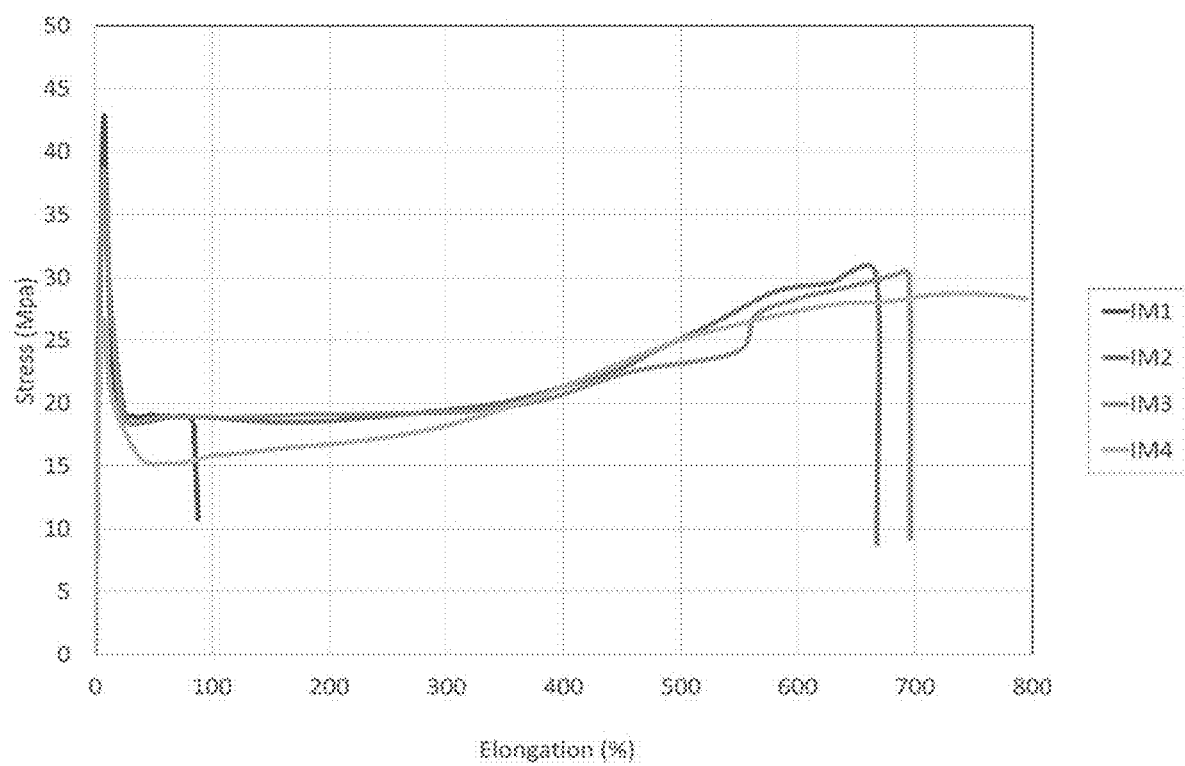
FIG. 2 shows stress strain curves of injection molded test bars made using binary and ternary blends of Table 1.

Stress strain curves in FIG. 2 clearly show an increase in the tensile toughness (area under the curve) of ternary blends IM2 through IM4 compared to binary blends IM1.

Figure 3:
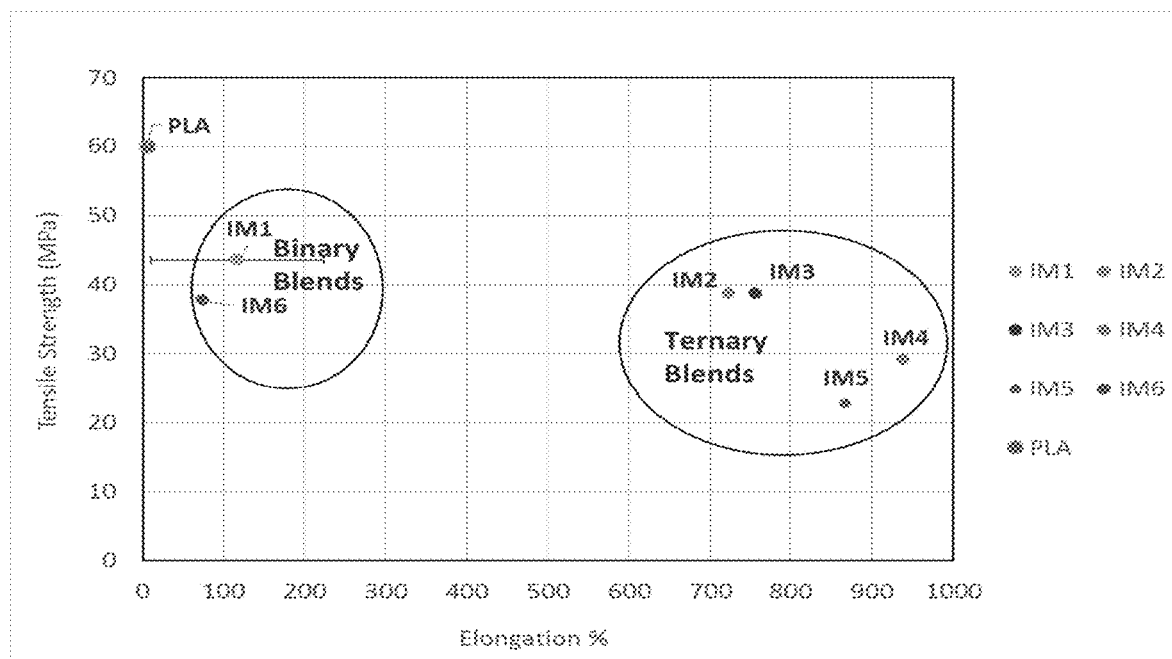
FIG. 3 shows comparison of tensile strength vs % elongation to break of PLA with binary and ternary blends of PLA, PBAT and PEG.

FIG. 3 shows a comparison of the tensile strength and % elongation to break. The difference between IM1 and IM2 is the addition of 5% PBAT. We see that there is a marginal drop in Tensile Strength, with a dramatic increase in % Elongation to break. Further increasing the PBAT content seen in blends IM3, IM4, and IM5 yield diminishing returns in improvements in elongation to break while decreasing tensile strength and mold-ability.

2) Extruded Films:

Ternary blends of Polylactic Acid (PLA), Polybutylene adipate terephthalate (PBAT), and Polyethylene Glycol (PEG) were compounded in different ratios as summarized in Table 3 below for extruding films. Talc was added at 5% for ease of processing on the compounding line. The objective was to improve mechanical performance of PLA-based films and study effect of addition of PEG in comparison to a binary blend of PLA/PBAT (F1) containing 30% PBAT. Two grades of PEG with 1,500 and 6,000 molecular weight were evaluated at let down of 5% and 10% each.

TABLE 3

Film Formulation Breakdown

| Sample | % PLA | % PBAT | % 6K PEG | % 1.5K PEG | % Talc |
|---|---|---|---|---|---|
| F1 (Control) | 65 | 30 | 0 | 0 | 5 |
| F2 | 55 | 30 | 10 | 0 | 5 |
| F3 | 60 | 30 | 5 | 0 | 5 |
| F4 | 55 | 30 | 0 | 10 | 5 |
| F5 | 60 | 30 | 0 | 5 | 5 |

Table 4 below summarizes mechanical properties of 4 mil thick extruded films including tensile strength, elongation and elmendorf tear in both machine (MD) and transverse directions (TD).

TABLE 4

Mechanical properties of extruded film (4 mil thickness)

|  |  | F1 | F2 | F3 | F4 | F5 |
|---|---|---|---|---|---|---|
| Strength MD (MPa) | Average | 23 | 36 | 38 | 37 | 36 |
|  | Std Dev | 5 | 1 | 1 | 4 | 1 |
| Strength TD (MPa) | Average | 28 | 32 | 33 | 31 | 34 |
|  | Std Dev | 2 | 1 | 1 | 3 | 3 |
| Elongation MD (%) | Average | 107 | 453 | 388 | 454 | 447 |
|  | Std Dev | 73 | 15 | 25 | 6 | 14 |
| Elongation TD (%) | Average | 215 | 421 | 424 | 435 | 382 |
|  | Std Dev | 91 | 3 | 17 | 42 | 75 |
| Tear MD (g) | Average | 192 | 1288 | 534 | 1229 | 282 |
|  | Std Dev | 27 | 180 | 124 | 147 | 24 |
| Tear TD (g) | Average | 101 | 880 | 222 | 414 | 146 |
|  | Std Dev | 26 | 241 | 5 | 23 | 18 |

Figure 4:
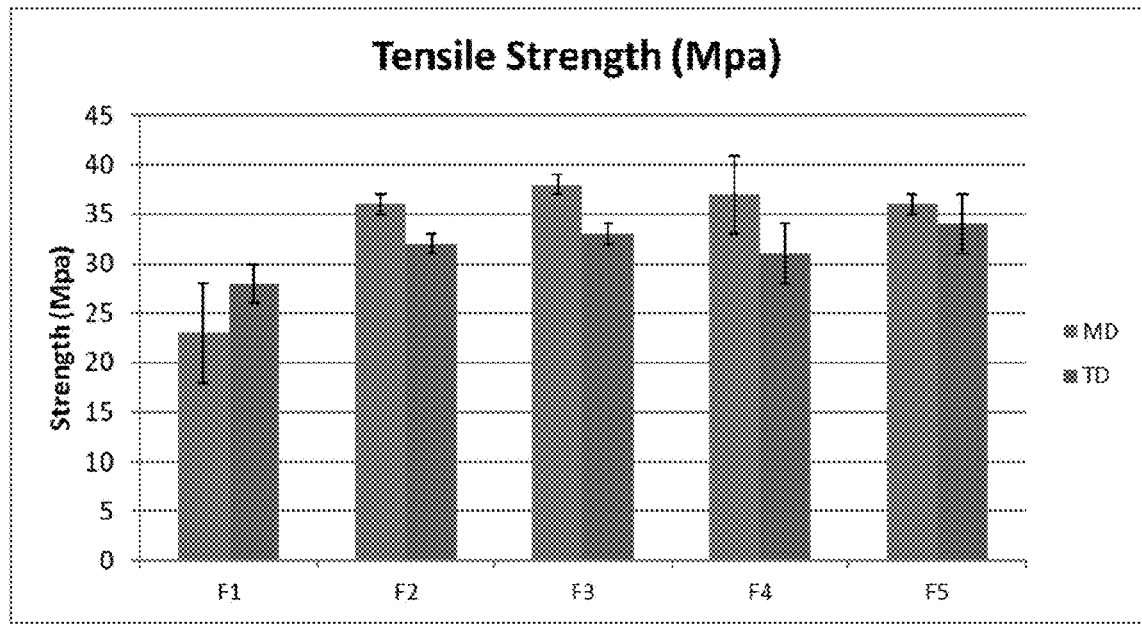
FIG. 4 shows tensile strength of blown films made with ternary blends of PLA, PBAT and PEG compared with a control film F1 made with only PLA & PBAT.

FIG. 4 shows tensile strength of all the films. Film formulation F1 was control formulation made with binary blend with PLA and PBAT. Formulations F2 and F3 were made with a higher molecular weight (6000) PEG while F4 and F5 were made with relatively lower molecular weight PEG (1500). Tensile strength was found to increase compared to the binary blends even with addition of plasticizer indicating some interaction within the three molecules. The Machine Direction saw an approximate 50% increase in strength while the Transverse direction saw an approximate 15% increase in strength compared to control film F1. As expected these tensile strengths are still less than that for pure PLA (~60 MPA). No significant difference was observed in strengths of blends made with different molecular weights of PEG.

Figure 5:
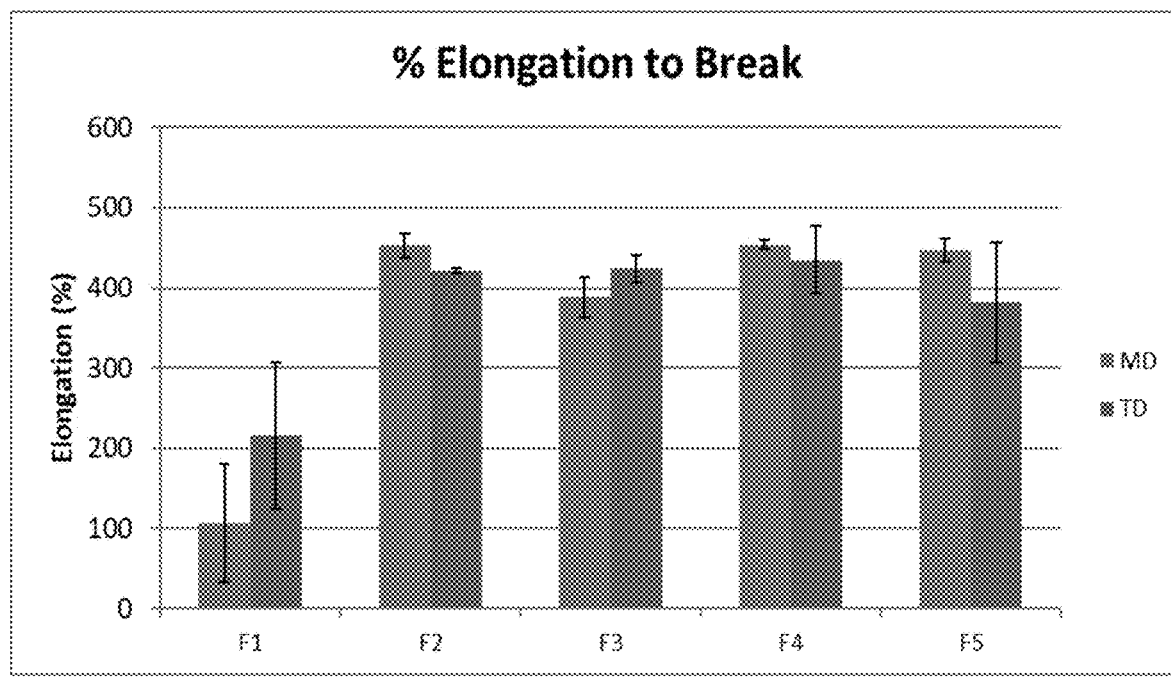
FIG. 5 shows % tensile elongation of blown films made with ternary blends of PLA, PBAT and PEG compared with a control film F1 made with only PLA & PBAT.

In the previous section, formulations of injection molded test bars made with ternary blends showed significant increase in % elongation compared to the binary blends. Films F2-F5, in FIG. 5 above, showed similar trends compared to binary blend F1. An approximate 200-300% increase in % elongation was seen at all loading percentages of the two different PEG grades. No difference in percent increase in % elongation to break was seen between the two grades of PEG. The unexpected performance improvement in % elongation was not dependent on molecular weight of PEG at least for the range of 1500-6000 molecular weight.

Figure 6:
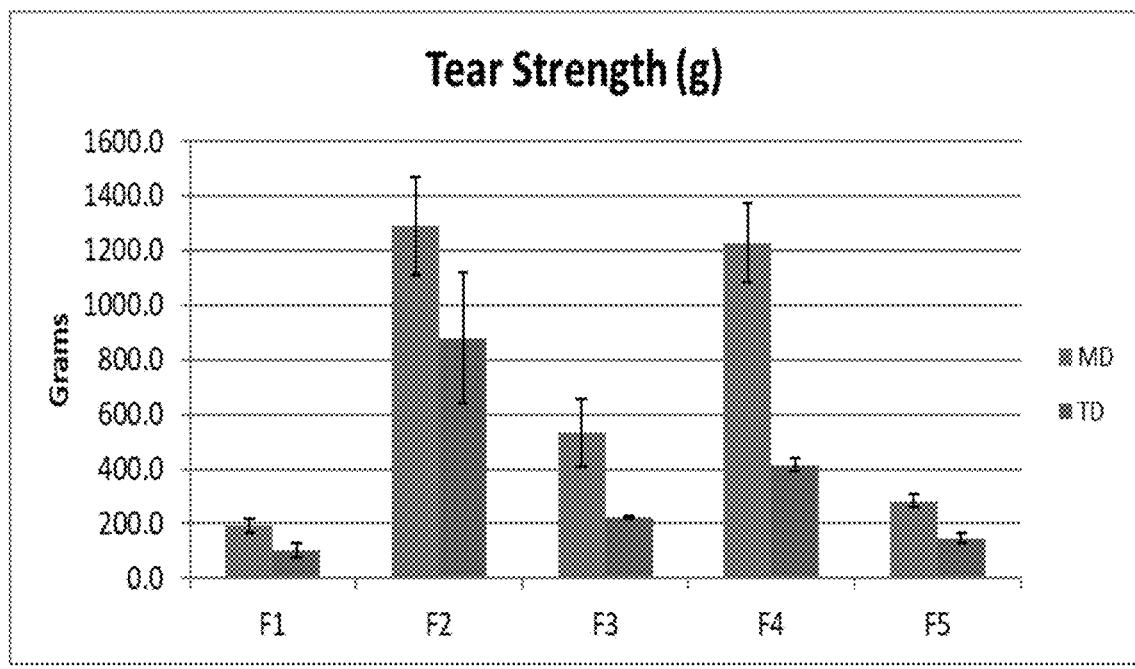
FIG. 6. shows elmendorf tear strength of blown films made with ternary blends of PLA, PBAT and PEG compared with a control film F1 made with only PLA & PBAT.

Elmendorf Tear of films is plotted in FIG. 6. An average 600% tear strength improvement was seen in the Machine Direction (MD) and a 900% increase was seen in the Transverse Direction (TD) for films made with ternary blends containing 10% PEG with 6000 molecular weight compared to binary blend F1 containing no PEG. The tear strength increase was reduced to 300% in TD with PEG at same loading but with lower molecular weight. The tear strength improvement was further reduced in both MD and TD at 5% let down of PEG compared to 10%. Higher plasticization effect obtained with higher % PEG possibly explains the higher tear strength at 10%. Thus, at PEG loadings from about 10% in the machine direction, according to ASTM D1922-09 achieved tear strengths of at least about 600 grams, desirably at least about 800 grams, or about 1,000 grams, and preferably at least about 1,200 grams.

Figure 7:
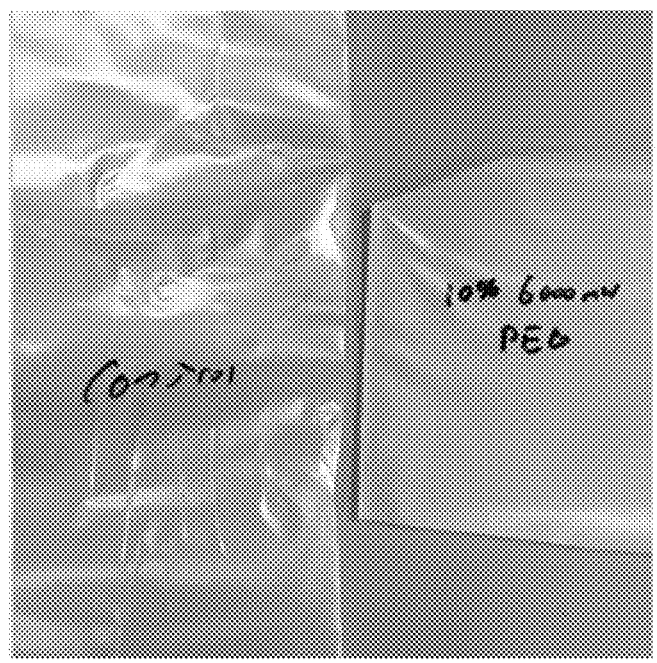
FIG. 7 shows film quality of film F1-binary blend PLA/PBAT (Left) vs. F3-ternary blend of PLA/PBAT/PEG (Right)

Film processability was improved in the 10% PEG formulations. These films were far superior to the control and 5% PEG formulations. As shown in FIG. 7 below less wrinkles and smoother film were obtained with 10% PEG loadings. Extruding film with high % PLA>50% and with improved tensile elongation and tear hasn't been reported in literature or produced commercially.

Summary:

Unexpectedly, the Blends of PLA with 5-30% PBAT and loadings of about 10% PEG increased the elongation to 750%+ for molded test bars as seen in FIG. 3. Additionally, 4 mil films showed a max in tear strength of about 1200 gms (in MD) and 900 gms (in TD) while maintaining other preferable properties.

These biodegradable and compostable blend compositions with or without biobased carbon content can be used in the manufacture of injection molded articles, in film applications, and in packaging to provide improved tear strength.

Molded articles showed increase in tensile elongation of 600-700%

4 mil films showed a maximum increase in tear strength of about 1200 gms (in MD) and 900 gms (in TD)

This performance improvement was in comparison to binary blends of PLA/PBAT or PLA/PEG (tested in this study) and other PLA blends reported in literature.

In conclusion, a typical non-compatibilized blend of PLA/PBAT was unexpectedly compatibilized with a polyethylene glycol polymer to show increases in mechanical properties well beyond the binary blends of PLA-PEG or PLA-PBAT. These mechanically superior ternary blends, show promise in many biobased and biodegradable product applications including molded articles and packaging film.

While in accordance with the patents statues, a best mode of preferred embodiment of the invention has been set forth, the inventions limited by the claims set forth herein.

REFERENCES

1. Jacobsen, S.; Fritz, H. G. *Polym. Eng. Sci* 1999, 39, 1303-1310.
2. Peng Cheng and Yan Pengfei. (2016). *PBAT/PLA blending compatibilizer and preparation method thereof*. CN106760253A. Changzhou Lvyuanyuan PolymerMaterials Co., Ltd.
3. Peng Cheng and Yan Pengfei. (2013). *Controllable-degradation PBAT/PLA (poly(butyleneadipate-co-terephthalate)/polylactic acid) composite film and preparation method thereof*. CN106674923A. Changzhou Lvyuanyuan PolymerMaterials Co., Ltd.
4. P Hongdilokkul et al 2015 *IOP Conf. Ser.: Mater. Sci. Eng.* 87 012112
5. K. Sungsanit, N. Kao, S. N. Bhattacharya, *Properties of linear poly(lactic acid)/polyethylene glycol blends*, Polymer Engineering & Science 2012:52(1):108-116.
6. https://plastics.ulprospector.com/generics/34/c/t/polylactic-acid-pla-properties-processing
7. Allison Flynn, Lennard F Torres, William J Orts, Artur Klamczynski, Bioderived compatibilizer for biopolymers, U.S. Pat. No. 9,139,689

What is claimed is:

1. A biodegradable and compostable blend of thermoplastic polymers, comprising:
   from about 50 wt. % to about 80 wt. % of one or more poly(lactic) acid (PLA) polymers wherein said PLA polymers, independently, have a weight average molecular weight of from about 125,000 to about 200,000;
   from about 5 wt. % to about 30 wt. % of one or more additional compostable polyesters comprising polybutylene succinate (PBS), polybutylene succinate adipate (PBSA), and polybutylene adipate co-terepthalate (PBAT) with or without biobased carbon content wherein said polyesters, independently, have a weight average molecular weight of from about 80,000 to about 175,000;
   from about 7 wt. % to about 15 wt. % of one or more polyethylene glycols (PEGs) with or without biobased carbon content, wherein said PEGs, independently, have a weight average molecular weight of from about 2,000 to about 10,000;
   wherein said weight percent is based upon the total weight of said one or more PLAs, said one or more additional compostable polyesters, and said one or more PEGs; and
   wherein said blend has an elongation of at least 500% according to ASTM Test D638-10 for injection molded specimens.

2. The blend of the thermoplastic polymers of claim 1, wherein the elongation of said blend is at least 600%.

3. The blend of the thermoplastic polymers of claim 1, wherein the amount of said one or more PLA polymers is from about 60 wt. % to about 80 wt. %.

4. The blend of the thermoplastic polymers of claim 3, wherein the elongation of the blend is at least 650%.

5. The blend of the thermoplastic polymers of claim 3, wherein the tear strength in in the machine direction is at least 900 grams according to ASTM 01922-09.

6. The blend of the thermoplastic polymers of claim 3, including from about 3 to about 7 wt. % of talc based upon the total weight of said one or more PLA polymers, said one or more additional compostable polyesters, and said one or more PEGs.

7. An injection molded article comprising the blend of claim 3.

8. The blend of the thermoplastic polymers of claim 1, wherein said one or more PLA polymers, independently, have a weight average molecular weight of from about 125,000 to about 160,000;
   wherein the amount of said one or more polyesters is from about 5 wt. % to about wt. %, wherein said one or more additional compostable polyesters, independently, have a weight average molecular weight of from about 130,000 to about 160,000; and
   wherein the amount of said one or more PEGs is from about 8 wt. % to about 12 wt. %.

9. The blend of the thermoplastic polymers of claim 8, where the elongation of the blend is at least 700%.

10. The blend of the thermoplastic polymers of claim 8, wherein the tear strength in the tear strength in the machine direction is at least 1,000 grams according to ASTM D1922-09.

11. The blend of the thermoplastic polymers of claim 8, including from about 3 to about 7 wt. % of talc based upon the total weight of said one or more PLA polymers, said one or more additional compostable polyesters, and said one or more PEGs.

12. The blend of the thermoplastic polymers of claim 1, wherein the amount of said one or more PLA polymers is from about 70 wt. % to about 80 wt. % wherein said one or more PLA polymers, independently, have a weight average molecular weight from about 125,000 to about 160,000;

wherein said one or more additional compostable polyesters is said polybutylene adipate co-terephthalate and wherein the amount thereof is from about 5 wt. % to about wt. %;

wherein the amount of said one or more PEGs is from about 9 wt. % to about 11 wt. %, wherein said one or more PEGs, independently, have a weight average molecular weight of from about 5,000 to about 7,000; and wherein the elongation of the blend is at least 750%.

13. The blend of the thermoplastic polymers of claim 12, wherein the tear strength in the machine direction is at least 1,200 grams according to ASTM D1922-09.

14. The blend of the thermoplastic polymers of claim 12, including from about 4 to about 6 wt. % of talc based upon the total weight of said one or more PLA polymers, said one or more additional compostable polyesters, and said one or more PEGs.

15. An injection molded article comprising the blend of claim 12.

16. A film comprising the blend of claim 12.

17. The blend of the thermoplastic polymers of claim 1, wherein the tear strength in the machine direction is at least 800 grams according to ASTM 01922-09.

18. The blend of the thermoplastic polymers of claim 1, including from about 2 to about 10 wt. % of talc based upon the total weight of said one or more PLA polymers, said one or more additional compostable polyesters, and said one or more PEGs.

19. A film comprising the blend of claim 1.

20. A packaging material comprising the blend of claim 1.

* * * * *

UNITED STATES PATENT AND TRADEMARK OFFICE
CERTIFICATE OF CORRECTION

PATENT NO. : 11,987,696 B2
APPLICATION NO. : 17/261367
DATED : May 21, 2024
INVENTOR(S) : Shilpa Manjure et al.

Page 1 of 1

It is certified that error appears in the above-identified patent and that said Letters Patent is hereby corrected as shown below:

In the Claims

Column 8, Claim 8, Line 56: "20" is missing between the second about and wt.%

Column 9, Claim 12, Line 14: "15" is missing between the word about and wt.%

Signed and Sealed this
Twentieth Day of August, 2024

Katherine Kelly Vidal
*Director of the United States Patent and Trademark Office*